United States Patent
Lee et al.

(10) Patent No.: US 9,558,711 B2
(45) Date of Patent: Jan. 31, 2017

(54) DISPLAY APPARATUS, MOBILE APPARATUS, SYSTEM AND SETTING CONTROLLING METHOD FOR CONNECTION THEREOF

(71) Applicant: SAMSUNG ELECTRONICS CO., LTD., Suwon-si (KR)

(72) Inventors: Sang-il Lee, Seongnam-si (KR); Joo-hyoun Park, Suwon-si (KR); Kee-sung Bae, Suwon-si (KR); Jin-goo Seo, Yongin-si (KR); Jae-yeop Kim, Seoul (KR); Hong-jin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 14/579,478

(22) Filed: Dec. 22, 2014

(65) Prior Publication Data

US 2015/0194126 A1 Jul. 9, 2015

(30) Foreign Application Priority Data

Jan. 6, 2014 (KR) .................. 10-2014-0001331

(51) Int. Cl.
*G09G 5/00* (2006.01)
*H04N 21/41* (2011.01)
(Continued)

(52) U.S. Cl.
CPC .......... *G09G 5/006* (2013.01); *H04N 21/4122* (2013.01); *H04N 21/41407* (2013.01); *H04N 21/4223* (2013.01); *H04N 21/43637* (2013.01)

(58) Field of Classification Search
CPC .......... G09G 5/00; G09G 5/006; G06F 3/147; H04N 21/436; H04N 21/43637; H04N 21/4122; H04N 21/4223; H04N 21/41407
(Continued)

(56) References Cited

U.S. PATENT DOCUMENTS 7,653,212 B2 *  1/2010  Haughawout .......... G08C 19/28
                                                         348/734
8,218,080 B2 *  7/2012  Xu ..................... G06K 9/00221
                                                         348/552
(Continued)

FOREIGN PATENT DOCUMENTS

CN  203278987 U  11/2013
EP  2131289 A1  12/2009

OTHER PUBLICATIONS

Alt, et al.; "Interaction Techniques for Creating and Exchanging Content with Public Displays", Human Factors in Computing Systems, Apr. 2013, 10 pages total.
(Continued)

*Primary Examiner* — Vijay Shankar
(74) *Attorney, Agent, or Firm* — Sughrue Mion, PLLC

(57) ABSTRACT

Disclosed are a display apparatus, a mobile apparatus, a system including the same, and a connection control method thereof. The display apparatus includes: a camera configured to receive second communication interface information displayed and supported by a mobile apparatus; and a controller configured to set up a communication connection with the mobile apparatus, based on first communication interface information supported by the display apparatus and the second communication interface information displayed and supported by the mobile apparatus and received through the camera.

34 Claims, 6 Drawing Sheets

(51) Int. Cl.
*H04N 21/414* (2011.01)
*H04N 21/4223* (2011.01)
*H04N 21/4363* (2011.01)

(58) Field of Classification Search
USPC .................. 345/1.1–2.3, 156–160, 204–215
See application file for complete search history.

(56) References Cited

U.S. PATENT DOCUMENTS

| | | |
|---|---|---|
| 2007/0126884 A1 | 6/2007 | Xu et al. |
| 2007/0279244 A1* | 12/2007 | Haughawout .......... G08C 19/28 340/4.31 |
| 2010/0081375 A1* | 4/2010 | Rosenblatt ............. G08C 17/02 455/41.1 |
| 2012/0009914 A1 | 1/2012 | Lee et al. |
| 2012/0010929 A1* | 1/2012 | Kolli .................... G06Q 30/018 705/14.16 |
| 2012/0119888 A1 | 5/2012 | Reeves et al. |
| 2012/0286672 A1 | 11/2012 | Holland et al. |
| 2013/0167208 A1 | 6/2013 | Shi |
| 2014/0064736 A1 | 3/2014 | Manabe |

OTHER PUBLICATIONS

Fasbender, et al.; "Media Delivery to Remote Renderers Controlled by the Mobile Phone", Consumer Communications and Networking Conference, Jan. 2009, 2 pages total.
Communication dated Jun. 29, 2015, issued by the European Patent Office in counterpart European Application No. 14196710.9.

\* cited by examiner

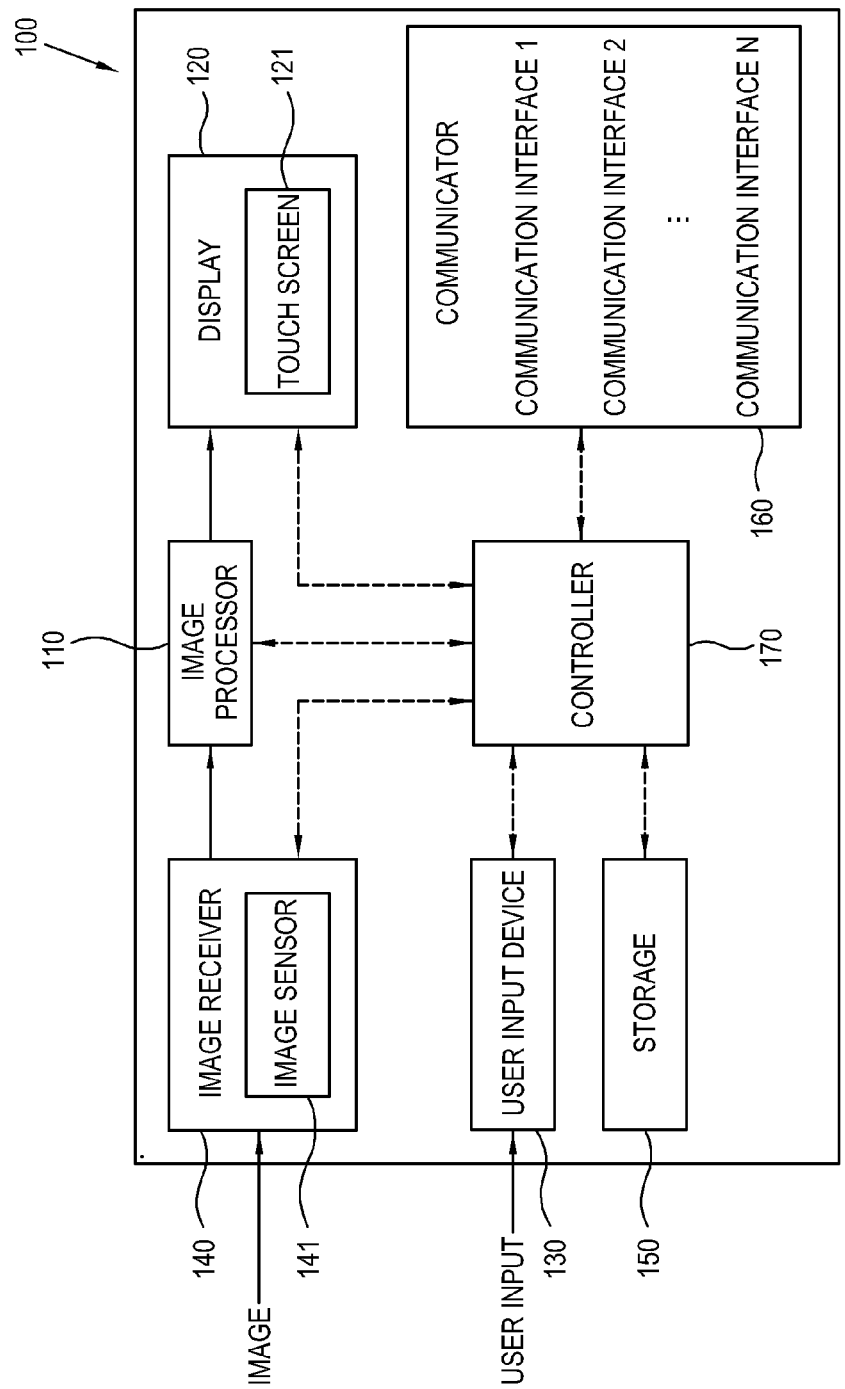

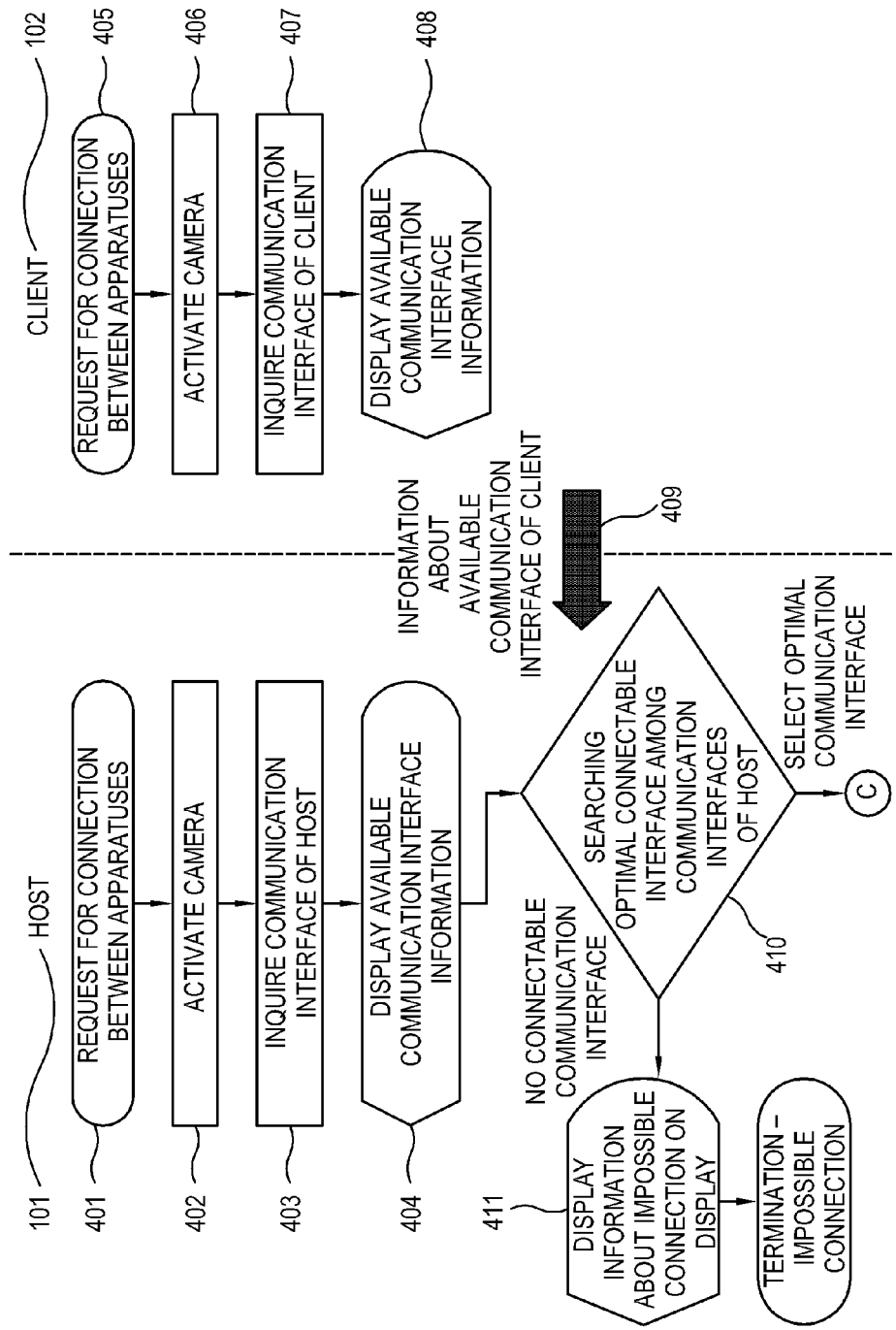

DISPLAY APPARATUS, MOBILE APPARATUS, SYSTEM AND SETTING CONTROLLING METHOD FOR CONNECTION THEREOF

CROSS-REFERENCE TO RELATED APPLICATION

This application claims priority from Korean Patent Application No. 10-2014-0001331, filed on Jan. 6, 2014 in the Korean Intellectual Property Office, the disclosure of which is incorporated herein by reference in its entirety.

BACKGROUND

Field

Apparatuses and methods consistent with the exemplary embodiments relate to a display apparatus, a mobile apparatus, a system including the same, and a connection control method thereof, and more particularly to a display apparatus, a mobile apparatus, a system including the same, and a connection control method thereof, in which a network connection is set up between apparatuses which are each provided with a display for displaying an image.

Description of the Related Art

To achieve data communication between a television (TV) and a mobile apparatus such as a smart phone, a tablet personal computer (PC), or other devices which are provided with a display, connection methods may be used, including, for example, an internal network method using an access point (AP), a direction connection method based on Wi-Fi direct, a method using Bluetooth, etc. Such conventional connection methods usually require procedures where a user manually controls the apparatuses, for example, a user manually first connects the mobile apparatus to a network to which the TV is connected and then connects the mobile apparatus to the TV, or a user switches modes of the TV and the mobile apparatus into a direct connection mode and inputs required identification information.

Therefore, a user, who has no background knowledge about the network connection or is not familiar with using menu control of the apparatus, may feel that the foregoing connection procedures are complicated, and it is thus inconvenient for him or her to properly use the corresponding apparatus.

SUMMARY

According to an aspect of an exemplary embodiment, there is provided a display apparatus including: a camera configured to receive second communication interface information displayed and supported by a mobile apparatus; and a controller configured to set up a communication connection with the mobile apparatus, based on first communication interface information supported by the display apparatus and the second communication interface information displayed and supported by the mobile apparatus and received through the camera.

The display apparatus may further include a display which may be configured to display the first communication interface information supported by the display apparatus.

The display apparatus may be configured to transmit the displayed first communication interface information to the mobile apparatus through a camera of the mobile apparatus, and the second communication interface information may include information about a communication interface selected by the mobile apparatus among a plurality of communication interfaces included in the transmitted first communication interface information.

The controller may be configured to activate the communication interface selected by the mobile apparatus, and display identification information of the display apparatus, the identification information to be used to establish a for connection of the activated communication interface.

The display may be configured to display the first communication interface information as at least one type recognizable by the mobile apparatus among a character, a quick response (QR) code and a barcode.

The display apparatus may further include a storage configured to store the first communication interface information supported by the display apparatus.

The storage may be further configured to store the second communication interface information supported by the mobile apparatus.

If there is a plurality of second communication interfaces included in the second communication interface information and supported by the mobile apparatus, the controller is configured to sort and store the second communication interface information in accordance with a preset order of priority.

The controller may be configured to select a second communication interface among the plurality of second communication interfaces in accordance with the preset order of priority, and set up the communication connection with the mobile apparatus through the selected second communication interface.

The display may be configured to display information about the selected second communication interface.

The controller may be configured to receive the identification information of the mobile apparatus, the identification information to be used to establish a connection of the selected second communication interface through the camera, and set up the communication connection with the mobile apparatus based on the received identification information.

According to another aspect of an exemplary embodiment, there is provided a connection control method to be performed by a display apparatus, the connection control method including: receiving, through a camera, second communication interface information displayed and supported by a mobile apparatus; and setting up a communication connection with the mobile apparatus, based on first communication interface information supported by the display apparatus and the second communication interface information displayed and supported by the mobile apparatus and received through the camera.

The method may further include: displaying the first communication interface information supported by the display apparatus.

The method may further include: transmitting the displayed first communication interface information to the mobile apparatus through a camera of the mobile apparatus, and the second communication interface information may include information about a communication interface selected by the mobile apparatus among a plurality of communication interfaces included in the transmitted first communication interface information.

The method may further include: activating the communication interface selected by the mobile apparatus; and displaying identification information of the display apparatus, the identification information to be used to establish a connection of the activated communication interface.

The displaying the first communication interface information includes displaying the first communication interface information as at least one type recognizable by the mobile apparatus among a character, a quick response (QR) code and a barcode.

The method may further include: storing the first communication interface information supported by the display apparatus.

The method may further include: storing the second communication interface information supported by the mobile apparatus.

The storing the second communication interface information includes, if there is a plurality of second communication interfaces included in the second communication interface information and supported by the mobile apparatus, sorting and storing the second communication interface information in accordance with a preset order of priority.

The method may further include: selecting one second communication interface among the plurality of second communication interfaces in accordance with the preset order of priority; and setting up the communication connection with the mobile apparatus through the selected second communication interface.

The method may further include: displaying information about the selected second communication interface.

The method may further include: receiving identification information of the mobile apparatus, the identification information to be used to establish a connection of the selected second communication interface through the camera; and setting up the communication connection with the mobile apparatus based on the received identification information.

According to another aspect of an exemplary embodiment, there is provided a mobile apparatus including: a camera configured to receive first communication interface information displayed and supported by a display apparatus; and a controller configured to set up a communication connection with the display apparatus, based on the first communication interface information displayed and supported by the display apparatus and received through the camera and second communication interface information supported by the mobile apparatus.

The mobile apparatus may further include a display configured to display the second communication interface information supported by the mobile apparatus.

The mobile apparatus may be configured to transmit the displayed second communication interface information to the display apparatus through a camera of the display apparatus, and the first communication interface information may include information about a communication interface selected by the display apparatus among a plurality of communication interfaces included in the transmitted second communication interface information.

The controller may be configured to activate the communication interface selected by the display apparatus, and display identification information of the mobile apparatus, the identification information to be used to establish a connection of the activated communication interface.

The mobile apparatus may further include a storage configured to store the first communication interface information supported by the display apparatus, wherein if there is a plurality of first communication interfaces included in the first communication interface information and supported by the display apparatus, the controller is configured to sort and store the first communication interface information in accordance with a preset order of priority.

The mobile apparatus may further include a display, and the controller may be configured to select one first communication interface among the plurality of first communication interfaces in accordance with the preset order of priority, control the display to display information about the selected first communication interface, and set up the communication connection with the display apparatus through the selected first communication interface.

The controller may be configured to receive identification information of the display apparatus, the identification information to be used to establish a connection of the selected first communication interface through the camera, and set up the communication connection with the display apparatus based on the received identification information.

According to another aspect of an exemplary embodiment, there is provided a connection control method to be performed by a mobile apparatus, the method including: receiving, through a camera, first communication interface information displayed and supported by a display apparatus; and setting up a communication connection with the display apparatus, based on the first communication interface information displayed and supported by the display apparatus and received through the camera and second communication interface information supported by the mobile apparatus.

According to another aspect of an exemplary embodiment, there is provided a system including a display apparatus and a mobile apparatus, the display apparatus including: a first display configured to display first communication interface information supported by the display apparatus; and a first camera configured to receive second communication interface information displayed by the mobile apparatus, and the mobile apparatus including: a second camera configured to receive the first communication interface information displayed and supported by the display apparatus; and a second display configured to display the second communication interface information to enable a connection with the display apparatus, the second communication interface information being determined based on the first communication interface information received through the second camera, wherein the display apparatus is configured to receive the second communication interface information through the first camera, and display identification information to be used to establish the connection on the first display, and the mobile apparatus is configured to attempt to establish the connection with the display apparatus based on the identification information.

According to another aspect of an exemplary embodiment, there is provided a system including a display apparatus and a mobile apparatus, the display apparatus including: a first camera configured to receive second communication interface information displayed and supported by the mobile apparatus; and a first display configured to display communication interface information to enable a connection with the mobile apparatus, the communication interface information being determined based on first communication interface information supported by the display apparatus and the second communication interface information, and the mobile apparatus including: a second camera configured to receive the communication interface information displayed on the display apparatus; and a second display configured to display identification information to be used to establish the connection, the identification information corresponding to the communication interface information received through the second camera, wherein the display apparatus is configured to attempt to establish the connection with the mobile apparatus based on the identification information.

BRIEF DESCRIPTION OF THE DRAWINGS

The above and/or other aspects will become apparent and more readily appreciated from the following description of exemplary embodiments, taken in conjunction with the accompanying drawings, in which:

FIG. 2 is a block diagram showing detailed elements of an apparatus according to an exemplary embodiment; and FIGS. 3A, 3B, 4A and 4B are flowcharts showing a connection control method of the communication system according to an exemplary embodiment.

DETAILED DESCRIPTION OF EXEMPLARY EMBODIMENTS

Below, exemplary embodiments will be described in detail with reference to accompanying drawings.

Figure 1:
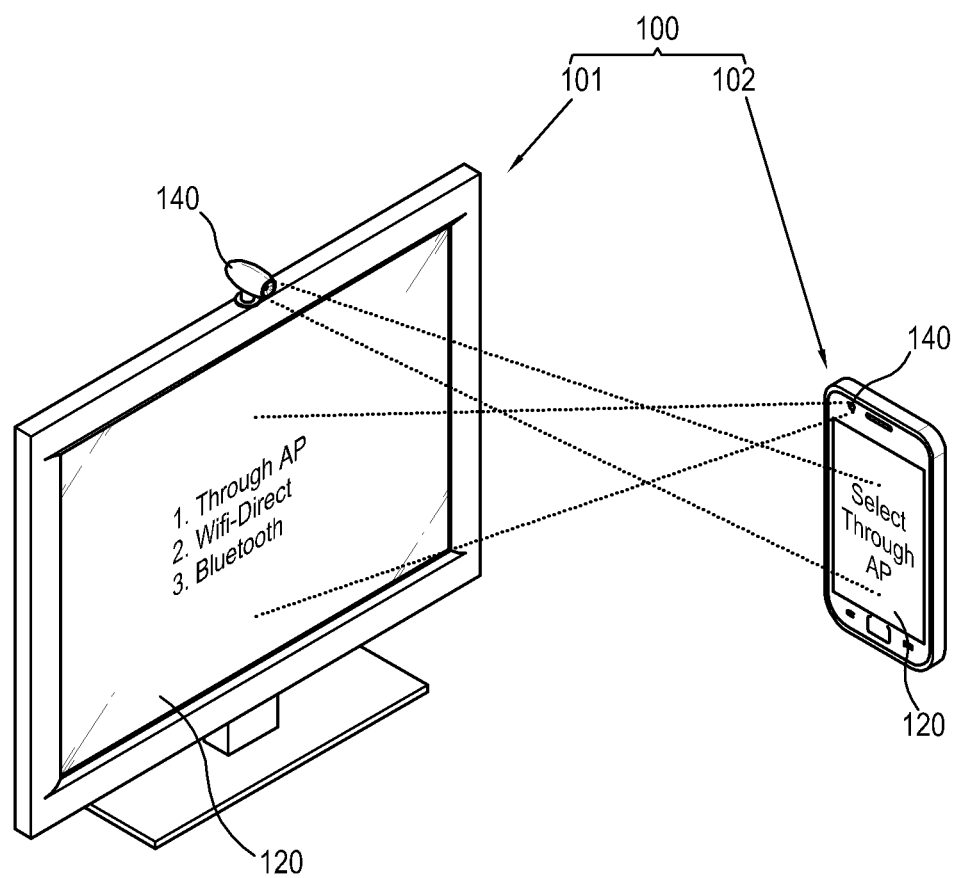
FIG. 1 shows an example of a communication system according to an exemplary embodiment.

FIG. 1 shows an example of a communication system according to an exemplary embodiment.

As shown in FIG. 1, the communication system according to an exemplary embodiment includes a plurality of apparatuses 100 including a first apparatus 101 and a second apparatus 102. For example, the first apparatus 101 may be implemented as a display apparatus, and the second apparatus 102 may be implemented as a mobile apparatus.

The first apparatus 101 achieved by the display apparatus processes an image signal provided from an external image source (not shown) to be displayed as an image on the display 120 in accordance with a preset imaging process. In this exemplary embodiment, the display apparatus 101 may be provided with an image receiver 140 including an image sensor 141, e.g., a camera at a predetermined position, e.g., at a front upper portion thereof.

In this exemplary embodiment, the display apparatus is achieved by a television (TV) that displays a broadcasting image based on a broadcasting signal or broadcasting information or broadcasting data received from a transmitter of a broadcasting station. However, the kind of image displayable by the display apparatus is not limited to a broadcasting image. For example, the display apparatus may display a moving image, a still image, an application, an on-screen display (OSD), a user interface (UI, hereinafter also referred to as a graphic user interface (GUI)) for a variety of control operations, and the like image based on a signal or data received from various image sources (not shown).

According to an exemplary embodiment, the display apparatus is achieved by a smart TV. The smart TV can receive and display a broadcasting signal in real time, and provide a convenient user environment for searching and reproducing various contents through the Internet based on a web browser function while at the same time displaying a broadcasting signal in real time. Also, the smart TV has an open software platform and thus provides a user with an interactive service. Therefore, the smart TV can provide a user with various contents, e.g., with an application providing a predetermined service through the open software platform. Such an application includes an application program capable of providing various services, for example, an application for providing a social network service (SNS), finance, news, weather, a map, music, a movie, a game, an electronic book, or many other types of services.

The present exemplary embodiment may be applied to a display apparatus different from the present exemplary embodiment, for example, a monitor connected to a computer, or other types of display apparatus.

The second apparatus 102 achieved by the mobile apparatus includes a digital apparatus such as a smart phone or other types of mobile phones, a tablet PC (e.g., a smart pad), a portable media player (e.g., MP3 player), a digital camera, a camcorder, etc. In this exemplary embodiment, the mobile apparatus may be provided with an image receiver 140 including an image sensor 141 at a predetermined position, for example, at a front and/or rear upper portion, for example, a camera. FIG. 1 illustrates an example where the mobile apparatus is implemented as a smart phone, but the exemplary embodiments are not limited thereto.

The communication system in this exemplary embodiment includes first and second apparatuses 101 and 102 as a plurality of different apparatuses that are connected to each other for communication and are provided with the display and the camera. Here, when connection is set up for communication between the first and second apparatuses 101 and 102, one apparatus, for example, the first apparatus 101, may operate as a host, and the other apparatus, for example, the second apparatus 102, may operate as a client.

FIG. 1 illustrates an example in which the first apparatus 101 is implemented as a TV, e.g., a display apparatus, and the second apparatus 102 is implemented as a smart phone, e.g., a mobile apparatus. For example, the apparatuses included in the communication system according to an exemplary embodiment may be variously achieved by a tablet PC and a smart phone, or by a TV and a portable media apparatus, or by two smart phones, respectively.

That is, the exemplary embodiment to be described later is only one example of many different types of examples which vary depending on the configuration or purpose of the system, and does not limit the present disclosure.

Below, detailed elements of the apparatus 100 according to an exemplary embodiment, which can be implemented as the display apparatus or the mobile apparatus, will be described with reference to FIG. 2.

FIG. 2 is a block diagram showing the detailed elements of the apparatus 100 according to an exemplary embodiment, and all the elements of the apparatus 100 shown in FIG. 2 are applied to the first apparatus 101 and the second apparatus 102 of FIG. 1.

As shown in FIG. 2, the apparatus 100 according to an exemplary embodiment includes an image processor 110 configured to process an image signal received from the outside, a display 120 configured to display an image signal processed by the image processor 110, a user input device 130 configured to receive a user's input, an image receiver 140 configured to receive an image from the outside, a storage 150 configured to store various types of data, a communicator 160 configured to perform wired and/or wireless communication with the outside, and a controller 170 configured to control the apparatus 100.

The image processor 110 performs various types of image processes with respect to the image signal. The image processor 110 outputs the processed image signal to the display 120 so that the display 120 can display an image.

To this end, the image processor 110 may receive an image receiver to receive the image signal from the outside. The image processor 110 may be implemented in various ways in accordance with the standards of the received image signal and the types of the apparatus 100. For example, the image processor 110 may wirelessly receive a radio frequency (RF) signal transmitted from a broadcasting station (not shown), or may receive the image signal based on composite video, component video, super video, SCART, high definition multimedia interface (HDMI) or other standards through a wire. If the image signal is a broadcasting signal, the image processor 110 includes a tuner tuned to a channel corresponding to the broadcasting signal.

Also, the image signal may be received from an external apparatus, and may be, for example, received from a personal computer (PC), an audio/video (AV) apparatus, a smart phone, other types of phones, or other types of external apparatuses. Also, the image signal may be based on data received from the Internet or other types of networks. In this case, the display apparatus 100 may perform network communication through the communicator 160. Also, the image signal may be based on data stored in a flash memory, a hard disk drive, or other types of nonvolatile storage 150. The storage 150 may be provided inside or outside the display apparatus 100. In the case that the storage 150 is provided outside the display apparatus 100, there may be further provided a connector (not shown) to which the storage 150 is connected.

Many different types of image processes may be performed by the image processor 110. For example, the image processor 110 may perform image processes including decoding corresponding to various image formats, de-interlacing, frame refresh rate conversion, scaling, noise reduction for improving image quality, detail enhancement, line scanning, etc. The image processor 110 may be implemented as a group of individual components for independently preforming such processes, or may be achieved by a system-on-chip (SoC) where various functions are integrated.

The display 120 displays an image based on the image signal processed by the image processor 110. The display 120 may be many different types. The display 120 may be, for example, implemented as liquid crystal, plasma, a light-emitting diode, an organic light-emitting diode, a surface-conduction electron-emitter, a carbon nano-tube, a nano-crystal, etc.

The display 120 may further include additional elements in accordance with a type of the display 120. For example, if the display 120 is implemented as the liquid crystal, the display 120 includes a liquid crystal display (LCD) panel (not shown), a backlight unit (not shown) to emit light to the LCD panel, and a panel driving substrate (not shown) for driving the panel (not shown).

In this exemplary embodiment, the display 120 may include a touch screen 121 for receiving input corresponding to a user's touch. The touch screen 121 may be, for example, achieved by a resistive type, a capacitive type, an infrared type or an acoustic wave type.

The touch screen 121 may display an object (e.g., a menu, a text, a still image, a moving image, a figure, an icon, and a shortcut icon) that includes menu items of the display apparatus 100 as the user interface (UI). A user may touch the object displayed on the touch screen 121 with his or her body (e.g., a finger) or a separate pointing device such as a stylus, thereby performing his or her input.

The touch screen 121 may provide a user with a graphic user interface (GUI) corresponding to various services (e.g., a phone call, data transmission, broadcasting, photographing, a moving picture or application). The touch screen 121 transmits an analog signal corresponding to a single touch or a multi touch input through the GUI to the controller 170.

According to an exemplary embodiment, the touch is not limited to the contact between the touch screen 121 and a user's body or the pointing device, and may include non-contact touch (for example, hovering performed at a detectable distance of 30 mm or less between the touch screen 121 and a user's body or between the touch screen 121 and the pointing device. It will be appreciated by those skilled in the art that the detectable contactless distance of the touch screen 121 may be varied depending on the performance or structure of the apparatus 100.

In this exemplary embodiment, the touch input may include a drag, flick, drag & drop, tap, long tap, or other types of touch input operations.

The display 120 in this exemplary embodiment displays communication interface information supported by the communicator 160. The controller 170 requests the communication interface information of the communicator 160, stored in the storage 150, and controls the display 120 to display the communication interface information.

The user input device 130 transmits various preset control commands or information to the controller 170 in response to a user's control or input.

In this exemplary embodiment, the user input device 130 may include a keypad (or an input panel, not shown) with numeral keys, menu keys or similar buttons provided in a main body of the apparatus 100, a remote controller that generates a preset command, data, information, or a signal for remotely controlling the TV and transmits the preset command, data, information, or signal to the apparatus 100, a keyboard, a mouse, or another type of peripheral input device separated from the main body. The input device is an external device capable of wirelessly communicating with the main body of the apparatus 100, and the wireless communication may include infrared communication, RF communication, wireless local area network (LAN), or other types of communication. The input device is controlled by a user and thus transmits a preset command to the apparatus 100.

The keypad may be implemented in various ways, for example, a physical keypad formed in front and/or lateral sides of the apparatus 100, a virtual keypad displayed within the touch screen 121, and a wirelessly connectable physical keypad. It will be easily appreciated by those skilled in the art that the physical keypad formed in front and/or lateral sides of the apparatus 100 may be excluded in accordance with the performance or structure of the apparatus 100.

Also, the user input device 130 may be provided in a remote controller and may further include a touch sensor (not shown) for sensing a user's touch and a motion sensor (not shown) for sensing motion of the user input device 130 caused by a user.

In this exemplary embodiment, the user input device 130 receives a user's request for communication connection with another apparatus, and the user input device 130 may include a dedicated button corresponding to the request for the communication connection with another apparatus.

The image receiver 140 may be implemented as a camera for receiving an image from the outside. The image receiver 140 may be installed at a predetermined position, for example, at an upper portion of the apparatus 100, but is not limited thereto. As necessary, the image receiver 140 may be separated from the main body of the apparatus 100 and installed in the exterior.

The image receiver 140 may include a lens (not shown) which transmits an image, and an image sensor 141 for sensing the image transmitted through the lens. The image sensor 141 may be implemented as a charge coupled device (CCD)/complementary metal-oxide semiconductor (CMOS) image sensor.

If the apparatus 100 is achieved by a mobile apparatus such as a smart phone, a tablet PC, or other type of device, the image receiver 140 may include at least one of a front first camera and a rear second camera, which can photograph a still image or a moving image under control of the controller 170. The image receiver 140 may include one or both of the first camera and the second camera. Also, the first camera or the second camera may further include an auxiliary light source (e.g., a flash) to provide the quantity of light needed for photographing.

In this exemplary embodiment, the image receiver 140 photographs an image displayed on a display of a different apparatus and reads the communication interface information supported by the different apparatus.

The image input through the image receiver 140 is processed in the image processor 110. The controller 170 can extract the communication interface information of a different apparatus (to be described later) from the image processed in the image processor 110. The controller 170 uses the extracted communication interface information to set up the communication connection with the different apparatus.

The storage 150 stores various types of data under control of the controller 170. The storage 150 may include a nonvolatile memory, a volatile memory, a flash memory, a hard disk drive (HDD) or a solid disk drive (SDD). The storage 150 is accessed by the controller 170, and performs various types of operations, such as, for example, reading, recording, modifying, deleting, updating, and other types of operations with regard to data under control of the controller 170.

The data stored in the storage 150 may include, for example, an operating system for driving the apparatus 100, as well as various applications, image data, additional data, and other types of data which are executable on the operating system.

Specifically, the storage 150 may store a signal or data which is input or output and corresponds to operations of the respective elements 110 to 140 and 160 under control of the controller 170. The storage 150 may store a graphical user interface (GUI) related to a control program for controlling the apparatus 100 and an application provided by a manufacturer or downloaded from the outside (e.g., the Internet), images for providing the GUI, user information, a document, a database, or related data.

The storage 150 further stores various pieces of information including coordinate information for sensing a user's input on the touch screen 121. For example, the controller 170 determines the kind of touch input sensed using the information previously stored in the storage 150 when a user's touch on the touch screen 121 is sensed, calculates the coordinate information (X and Y coordinates) corresponding to the touch position, and transmits the calculated coordinate information to the image processor 110. Further, an image corresponding to the determined kind of touch input and the touch position may be displayed on the display 120 by the image processor 110.

In this exemplary embodiment, the storage 150 may further store the communication interface information (or the network interface information) supported by the communicator 160. Here, the storage 150 may previously store the communication interface information supported by the communicator 160, or may be implemented to inquire or search for the available communication interfaces in response to a user's request for connection between the apparatuses and store information corresponding to the inquiry or search results.

According to an exemplary embodiment, the term 'storage' refers to a storage 150, a read only memory (ROM, not shown) in the controller 170, a random access memory (not shown), or a memory card (not shown) mounted to the apparatus 100 (for example, a micro SD card, a memory stick, or another type of mountable memory card).

The communicator 160 performs communication with a different apparatus. In this exemplary embodiment, the communicator 160 may support at least one communication interface among communication interfaces 1 to N such as Wifi, Bluetooth, radio frequency, Zigbee, a wireless LAN, infrared communication, ultra wideband (UWB), near field communication (NFC), or other types of communication interfaces.

If the apparatus 100 is implemented as a mobile phone such as a smart phone, the communicator 160 in this exemplary embodiment further includes a mobile communicator (not shown). The mobile communicator transmits or receives a wireless signal for voice communication, visual communication, short message service (SMS), multimedia messaging service (MMS) and data communication with the cellular phone, a smart phone, a tablet PC, or the like having a phone number connectable with the apparatus 100. Also, the communicator 160 in this exemplary embodiment may further include at least one wired communication interface.

The communicator 160 in this exemplary embodiment may be built-in to the main body of the apparatus 100, may be implemented in the form of a dongle or a module, or may be detachably connected to a connector (not shown) of the apparatus 100.

The controller 170 performs control operations with regard to various elements of the apparatus 100. For example, the controller 170 controls the image process performed by the image processor 110, performs control operations corresponding to commands from the user input device 130, and performs an operation corresponding to a user's touch by sensing a control position corresponding to the user's touch on the touch screen 121 and setting up virtual points (X and Y coordinates) corresponding to the control position, thereby controlling general operations of the apparatus 100. For example, the controller 170 may be implemented in the form of combining a central processing unit (CPU) with software.

The controller 170 controls the general operations of the apparatus 100 and signal flow between internal elements 110 to 160 of the apparatus 100, and processes data. The controller 170 controls power supplied from a power supply (not shown) to the internal elements 110 to 160. Also, if a user's input or a stored setting condition is satisfied, the controller 170 may run an operating system (OS) and execute various applications stored in the storage 150.

According to an exemplary embodiment, the controller 170 of the apparatus 100 controls the display 120 to display communication interface information supported by the communicator 160 of the apparatus 100 in response to a user's control of a communication connection with a different apparatus. The communication interface information supported by the communicator 160 is previously stored in the storage 150, and may be displayed on the display 120 in various forms such as a character, a quick response (QR) code, a barcode, or other forms.

Also, the controller 170 activates the image receiver 140 in response to a user's control of the communication connection with the different apparatus, and receives the communication interface information of the different apparatus sensed through the image sensor 141. Further, the controller 170 analyzes the input communication interface information of the different apparatus, compares the analyzed communication interface information of the different apparatus with the communication interface information supported by the corresponding apparatus 100, determines the communication interface to be used in the communication connection, and sets up the communication connection with the different apparatus based on the determined communication interface.

The controller 170 sets up the communication connection through the communication interface supported in common by both the apparatus 100 and the different apparatus. If there are a plurality of communication interfaces supported in common by the two apparatuses, the controller 100 selects an optimum interface, for example, selects one of the communication interfaces in accordance with at least one among a system environment, a preset priority and user settings.

In this exemplary embodiment, one apparatus 100 among the plurality of apparatuses 100 in the communication system serves as a host, and another apparatus 100 serves as a client in the communication connection.

Hereinafter, for exemplary purposes only, it will be described that a first apparatus 101 of FIG. 1, that is, the display apparatus, serves as the host and a second apparatus 102, that is, the mobile apparatus, serves as the client. However, the exemplary embodiments may be applied to a reverse case, that is, the second apparatus 102 may serve as the host and the first apparatus 101 may serve as the client.

Below, a method of controlling connection between the apparatuses in the communication system will be described with reference to FIGS. 3A, 3B, 4A and 4B.

FIGS. 3A, 3B, 4A and 4B are flowcharts showing a connection control method of the communication system according to an exemplary embodiment. As shown in FIGS. 3A, 3B, 4A and 4B, the method of controlling the connection is performed by interaction between the host 101 and the client 102.

Figure 3A:
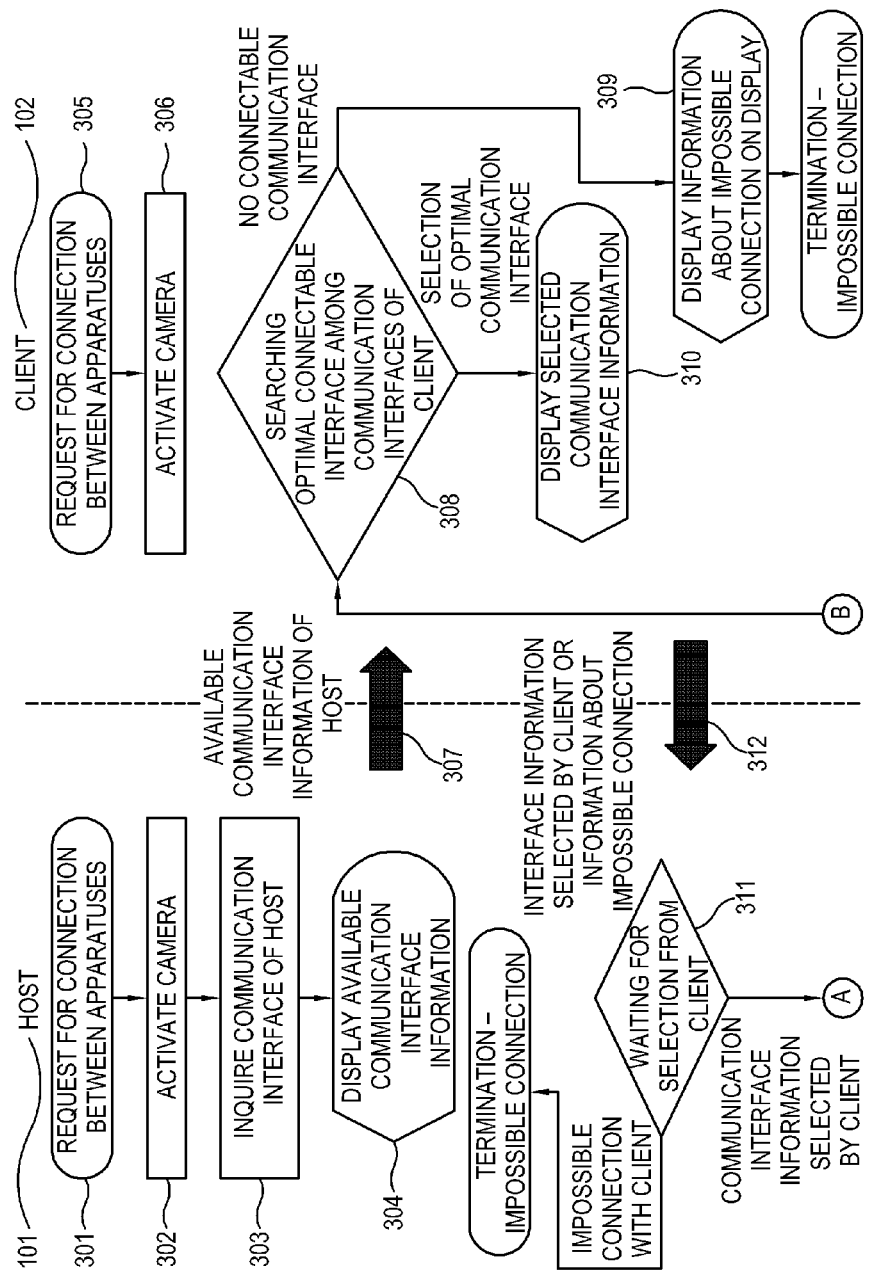

As shown in FIG. 3A, the host, that is, the first apparatus 101, may receive a request for connection between the apparatuses 101 and 102 from a user at operation 301. A user controls the user input device 130 of the first apparatus 101 to request the communication connection with the second apparatus 102. For example, a user may request the communication connection by a simple method, such as, for example, the user pressing a dedicated button corresponding to the request for the communication connection. Alternatively, a user may request the communication connection by other methods, such as the user controlling the touch screen 121 or the input device separated from the first apparatus 101 to select a communication connection mode.

In response to the request for the connection between the apparatuses 101 and 102 received in operation 301, the controller 170 activates the image receiver 140 of the first apparatus 101, for example, the camera, at operation 302). The first apparatus 101 may switch an operation mode into the communication connection mode.

Also, in response to the request for the connection between the apparatuses 101 and 102 received in operation 301, the controller 170 inquires (searches for) the first communication interface information stored in the storage 150 which is supported by the communicator 160 of the first apparatus 101 at operation 303.

In response to the inquiry result of operation 303, the controller 170 controls the display 120 to display the first communication interface information available by the first apparatus 101 at operation 304. Here, the first communication interface information displayed on the display 120 may be displayed in various forms such as a character, a quick response (QR) code, a barcode, or other type of indicator that can be recognized by the second apparatus 102. FIG. 1 illustrates an example in which the first communication interface information is displayed on the display 120 when the first apparatus 101 supports an access point (AP), Wi-fi and Bluetooth. Further, the first apparatus 101 waits for input from the second apparatus 102. It is understood that the first communication interface information is not limited to being a visual indicator.

Meanwhile, the client, that is, the second apparatus 102, may receive a request for connection between the apparatuses 101 and 102 from a user at operation 305. Here, a user controls the user input device 130 of the second apparatus 102 and requests to establish the communication connection with the first apparatus 101. For example, a user may request the communication connection using a simple method such as the user controlling (e.g., pressing) a dedicated button corresponding to the request for the communication connection. Alternatively, a user may request the communication connection in another manner, such as, for example, the user controlling the touch screen 121 or the input device separated from the second apparatus 102 to select a communication connection mode. Here, the requests for the connection in operations 301 and 305 may be received at the same time or at different times, or may be received independently of each other.

In response to the request for the connection between the apparatuses 101 and 102 received in operation 305, the controller 170 of the second apparatus 102 activates the image receiver 140 of the second apparatus 102, for example, activates the camera at operation 306. Here, the second apparatus 102 may switch an operation mode to be the communication connection mode.

In operation 307, the second apparatus 102 receives the first communication interface information available in the host device 101, which is displayed in operation 304, through the camera activated in operation 306.

The first apparatus 101 and the second apparatus 102 may be adjusted in position to make the camera photograph the displays of each other. For example, as shown in FIG. 1, the display of the mobile apparatus 102 is positioned to be recognized by the camera of the display apparatus 101, and at the same time, a TV screen of the display apparatus 101 is positioned to be recognized by the camera of the mobile apparatus 102.

To this end, in response to the request for the connection between the apparatuses 101 and 102 received in operations 301 and 305, the first and second apparatuses 101 and 102 may display a message on their respective displays so that the camera of each of the respective apparatuses can be positioned towards the display screen of the apparatus desired for connection.

For example, the display may show a message that says "Please position the camera on the screen of the apparatus desired for connection." Then, a user checks the displayed message and adjusts the positions of the first and second apparatuses 101 and 102.

The controller 170 of the second apparatus 102 searches the communication interface for optimum connection, based on the first communication interface information received in operation 307 and the second communication interface information stored in the storage 150 and which is supported by the communicator 160 of the second apparatus 102 at operation 308.

Specifically, the controller 170 of the second apparatus 102 recognizes a type, e.g., a character, a QR code, or some other indicator of first communication interface information received through the camera, analyzes the recognized data, and stores the first communication interface information supportable by the first apparatus, e.g., the host 101, in the storage 150 of the second apparatus 102. If there is a plurality of first communication interfaces supportable by the host 101, the second apparatus 102 sorts and stores the plurality of first communication interfaces in accordance with a preset order of priority. The plurality of sorted and stored first communication interfaces becomes a candidate set available to establish a connection with the host. The preset order of priority may be determined based on many different types of factors related to performance in a system environment, for example, throughput, reliability, and other factors. To this end, the order of priority about the communication interface corresponding to the performance may be previously set up and stored in the storage 150 of the second apparatus 102. Also, the order of priority may be determined in accordance with user settings as necessary, thereby reflecting a user's preference.

Further, the controller 170 of the second apparatus 102 compares the second communication interface information supported by the second apparatus, e.g., the client 102, with the first communication interface information, and thus selects an optimal interface. The second apparatus 102 uses information stored in the storage 150 to select the interface having the highest order of priority among the communication interfaces supported in common between the first and second apparatuses 101 and 102 as the optimal interface.

In operation 308, if there is no communication interface connectable in common by the first and second apparatuses 101 and 102, the second apparatus 102 displays information about connection impossibility on the display 120 at operation 309). Thus, the second apparatus 102 stops trying to establish the connection and terminates the communication connection mode.

If the optimal communication interface is selected in operation 308, the second apparatus 102 displays the selected optimal communication interface information, e.g., access point (AP), on the display 120, as shown in FIG. 1, at operation 310.

Further, while the first apparatus 101 waits for a selection of an optical communication interface from the second apparatus 102 at operation 311, the information about the connection impossibility of operation 309 based on the searching result of operation 308 or the selected communication interface information of operation 310 is input to the first apparatus, e.g., the host 101, through the camera activated in operation 302 at operation 312.

If the information input in operation 312 indicates an impossible connection with the client, the first apparatus 101 stops trying to establish the connection and terminates the communication connection.

Figure 3B:
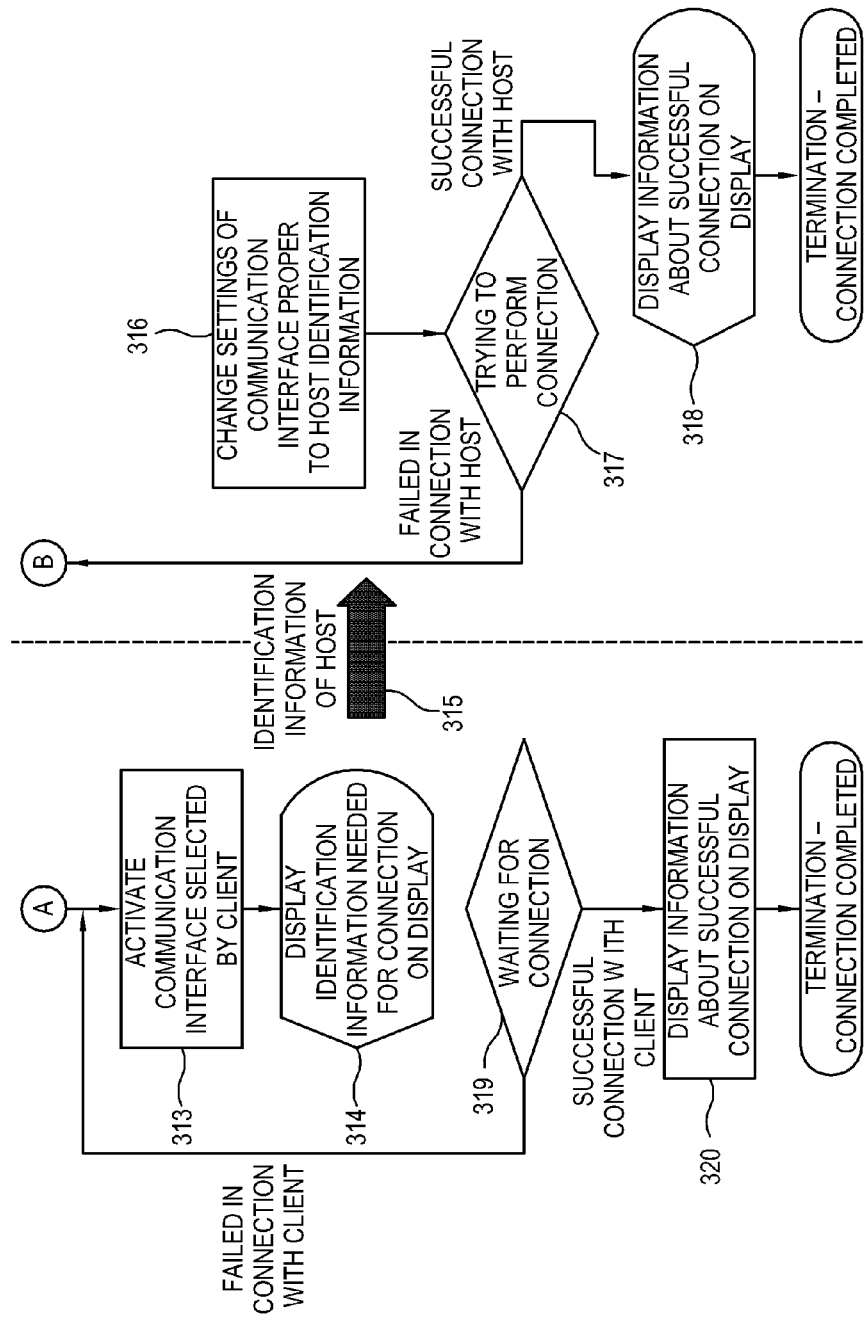

If the information input in operation 311 indicates the communication interface information selected by the client, the communication interface selected by the client among the communication interfaces supported by the communicator 160 of the first apparatus 101 is activated as shown in FIG. 3B at operation 313. Further, the operation mode of the first apparatus 101 can be changed into a host state mode.

The information needed for a connection based on the communication interface activated in operation 313, e.g., the host identification information, is displayed on the display 120 of the first apparatus 101, e.g., the host, at operation 314. For example, if the selected communication interface is Bluetooth, the host identification information of operation 314 may be a Bluetooth address of the first apparatus 101 in a preset bite (e.g., 6 bytes). If the selected communication interface is RF, the host identification information of the operation 314 may be a Mac Address of the first apparatus 101. Also, if the selected communication interface is an AP or Wi-Fi, the host identification information may be an Internet Protocol (IP) Address.

The host identification information displayed in operation 314 is input to the second apparatus, e.g., the client 102, through the camera activated in operation 306 at operation 315.

The second apparatus 102 changes settings of the communication interface to correspond to the host identification information input in operation 315 at operation 316, and tries the connection with the host at operation 317. If the selected communication interface is Bluetooth or RF, the Bluetooth address or media access control (MAC) address of the second apparatus 102 is displayed as the client identification information on the display 120 of the second apparatus 102, and transmitted through the camera of the first apparatus 101.

If the host and the client are successfully connected by the connection attempt of operation 317, the second apparatus 102 displays information indicating the successful connection on the display 120 at operation 318. Then, the communication connection mode of the second apparatus 102 may terminate.

While the first apparatus 101 waits for the connection from the second apparatus 102 at operation 319, if the host and the client are successfully connected by the connection attempt of operation 317, the first apparatus 101 displays the information about the successful connection on the display 120 at operation 320. Then, the communication connection mode of the first apparatus 102 may terminate.

Meanwhile, if the host and the client are unsuccessfully connected by the connection attempt of operation 317, the second apparatus 102 searches the communication interface of the operation 308 again. The controller 170 of the second apparatus 102 deletes the information related to the communication interface which failed to establish the connection from the candidate set stored in the storage 150, and selects the communication interface of the next order of priority from the others of the candidate set.

Also, the first apparatus 101 receives the re-searching results of the second apparatus 102, and activates the communication interface corresponding to the re-searching result in operation 313.

In the foregoing exemplary embodiments shown in FIGS. 3A and 3B, the host 101 displays the available first interface information, and the client 102 receives the displayed first interface information through the camera and selects the optimum communication interface, thereby performing the communication connection between the host 101 and the client 102.

In contrast, in the following exemplary embodiment shown in FIGS. 4A and 4B to be described later, the client 102 also displays the available second interface information, and the host 101 receives the displayed second interface information through the camera and selects the optimal communication interface, thereby performing the communication connection between the host 101 and the client 102.

Specifically, as shown in FIG. 4A, the host, e.g., the first apparatus 101 may receive a request for connection between the apparatuses 101 and 102 from a user at operation 401. A user controls the user input device 130 of the first apparatus 101 to request the communication connection with the second apparatus 102. For example, a user may request the communication connection using a simple method such as the user pressing a dedicated button corresponding to the request for the communication connection. Alternatively, a user may request the communication connection in various other ways, such as controlling the touch screen 121 or the input device separated from the first apparatus 101 to select a communication connection mode.

In response to the request for the connection between the apparatuses 101 and 102 received in operation 401, the controller 170 activates the image receiver 140 of the first apparatus 101, that is, the camera, at operation 402. The first apparatus 101 may switch an operation mode into the communication connection mode.

Also, in response to the request for the connection between the apparatuses 101 and 102 received in operation 401, the controller 170 inquires the first communication interface information which is stored in the storage 150 and supported by the communicator 160 of the first apparatus 101 at operation 403.

In response to the inquiry result of operation 403, the controller 170 controls the display 120 to display the first communication interface information available by the first apparatus 101 at operation 404. The first communication interface information displayed on the display 120 may be displayed in various forms such as a character, a quick response (QR) code, a barcode, or other forms that can be recognized by the second apparatus 102. As necessary, the operations 403 and 404 of inquiring and displaying the first communication interface may be omitted.

Meanwhile, the client, that is, the second apparatus 102 may receive a request for connection between the apparatuses 101 and 102 from a user at operation 405. A user controls the user input 140 of the second apparatus 102 and requests for the communication connection with the first apparatus 102. For example, a user may request the communication connection by using a simple method such as controlling a dedicated button provided for the request corresponding to the communication connection. Alternatively, a user may request the communication connection in other ways, such as controlling the touch screen 121 or the input device separated from the second apparatus 102 to select a communication connection mode. The requests for the connection in operations 401 and 405 may be received at the same time or at different times, or may be received independently of each other.

In response to the request for the connection between the apparatuses 101 and 102 received in operation 405, the controller 170 of the second apparatus 102 activates the image receiver 140 of the second apparatus 102, for example, the camera, at operation 406. The second apparatus 102 may switch an operation mode into the communication connection mode.

Also, in response to the request for the connection between the apparatuses 101 and 102 received in operation 405, the controller 170 of the second apparatus 102 inquires the second communication interface information which is stored in the storage 150 and supported by the communicator 160 of the second apparatus 102 at operation 407.

In response to the inquiry result of operation 407, the controller 170 controls the display 120 to display the second communication interface information available by the second apparatus 102 at operation 408. The second communication interface information displayed on the display 120 may be displayed in various forms such as a character, a quick response (QR) code, a barcode, or other indicator that can be recognized by the first apparatus 101. It is understood that the second communication interface information is not limited to being a visual indicator.

At operation 409, the first apparatus 102 receives the first communication interface information available by the client device 102 displayed in operation 408 through the camera activated in operation 406.

The first apparatus 101 and the second apparatus 102 may be adjusted in position to make the respective cameras photograph the displays of the other apparatus. For example, as shown in FIG. 1, the display of the mobile apparatus 102 is positioned to be recognized by the camera of the display apparatus 101, and at the same time a TV screen of the display apparatus 101 is positioned to be recognized by the camera of the mobile apparatus 102.

To this end, in response to the request for the connection between the apparatuses 101 and 102 received in operations 401 and 405, the first and second apparatuses 101 and 102 may display a message on their respective displays so that the camera of the apparatuses can be positioned to view the display screens of the apparatus desired for connection. For example, the displays may show a message that states: "Please position the camera on the screen of the apparatus desired for connection." Then, a user checks the displayed message and adjusts the positions of the first and second apparatuses 101 and 102.

The controller 170 of the first apparatus 101 searches the communication interface for an optimum connection, based on the second communication interface information received in operation 409 and the first communication interface information stored in the storage 150 and supported by the communicator 160 of the first apparatus 101 at operation 410.

Specifically, the controller 170 of the first apparatus 101 recognizes a type, e.g., a character, a QR code, or other type of second communication interface information received through the camera, analyzes the recognized data, and stores the second communication interface information supportable by the second apparatus, e.g., the client 102 in the storage 150 of the first apparatus 101. If the client 102 supports a plurality of second communication interfaces, the second apparatus 102 sorts and stores the plurality of second communication interfaces in accordance with a preset order of priority. The plurality of sorted and stored second communication interfaces becomes a candidate set available in connection with the client. The preset order of priority may be determined based on factors related to performance in a system environment, for example, throughput, reliability, or other factors. To this end, the order of priority about the communication interface corresponding to the performance may be previously set up and stored in the storage 150 of the first apparatus 101. Also, the order of priority may be determined in accordance with user settings as necessary, thereby reflecting a user's preference.

Further, the controller 170 of the first apparatus 102 compares the second communication interface information supported by the second apparatus, e.g., the client 102, with the first communication interface information, and thus selects an optimal interface. The first apparatus 101 uses information stored in the storage 150 to select the interface having the highest order of priority among the communication interfaces supported in common between the first and second apparatuses 101 and 102 as the optimal interface.

In operation 410, if there is no communication interface connectable in common by the first and second apparatuses 101 and 102, the first apparatus 101 displays information about connection impossibility on the display 120 at operation 411. Thus, the first apparatus 101 stops trying to establish the connection and terminates the communication connection mode.

Figure 4B:
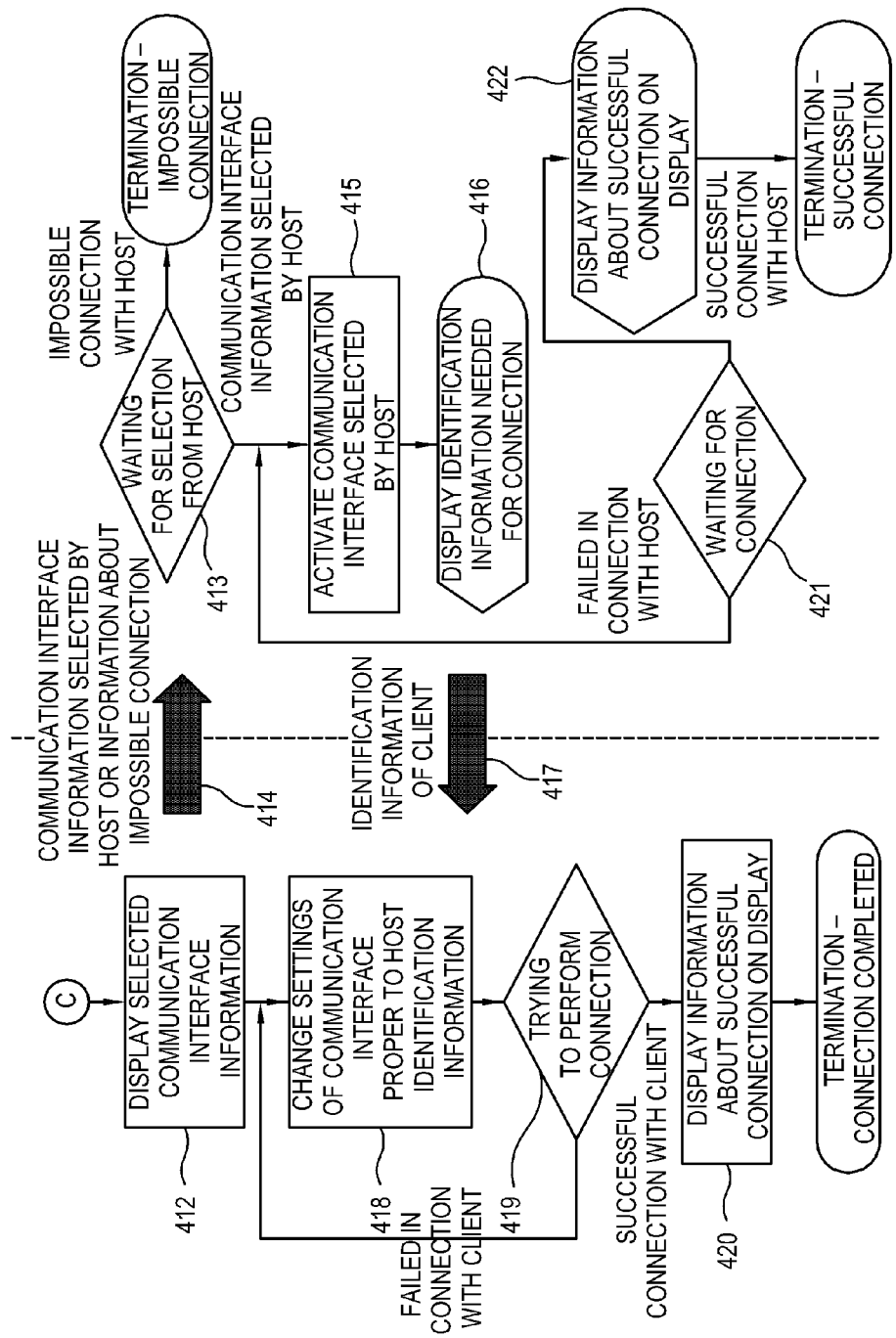

If the optimal communication interface is selected in operation 410, the first apparatus 101 displays the selected optimal communication interface information on the display 110 as shown in FIG. 4B at operation 412.

Further, while the second apparatus 102 waits for a selection from the first apparatus 101 at operation 413, information indicating the connection impossibility of operation 411 based on the searching result of operation 410 or the selected communication interface information of operation 412 is input to the second apparatus, e.g., the client 102 through the camera activated in the operation 406, at operation 414.

If the information input in operation 414 indicates an impossible connection with the client, the second apparatus 102 stops trying to establish the connection and terminates the communication connection.

If the information input in operation 414 includes the communication interface information selected by the host, the communication interface selected in the host among the communication interfaces supported by the communicator 160 of the second apparatus 102 is activated at operation 415. Further, the operation mode of the second apparatus 102 can be changed into a client state mode.

The information needed for connection based on the communication interface activated in operation 415, e.g., the client identification information, is displayed on the display 120 of the second apparatus 102, e.g., the client, at operation 416. The client identification information may be one of a Bluetooth address, MAC address and IP address of the second apparatus 102.

At operation 417, the client identification information displayed in operation 416 is input to the first apparatus, e.g., the host 101, through the camera activated in operation 401.

At operation 418, the first apparatus 101 changes settings of the communication interface to correspond to the client identification information input in operation 417, and tries the connection with the client at operation 419. If the selected communication interface is Bluetooth or RF, the Bluetooth address or MAC address of the first apparatus 101 is displayed as the host identification information on the display 120 of the first apparatus 101 and transmitted through the camera of the second apparatus 102.

If the host and the client are successfully connected by the connection attempt of operation 419, the first apparatus 101 displays information about the successful connection on the display 120 at operation 420. Then, the communication connection mode of the first apparatus 101 may terminate.

While the second apparatus 102 waits for the connection from the second apparatus 102 at operation 421, if the host and the client are successfully connected by the connection attempt of the operation 419, the second apparatus 102 displays the information about the successful connection on the display 120 at operation 422. Then, the communication connection mode of the second apparatus 102 may terminate.

Meanwhile, if the host and the client are unsuccessfully connected by the connection attempt of operation 419, the first apparatus 101 searches for another communication interface by repeating operation 418. Here, the controller 170 of the first apparatus 101 deletes the communication interface which failed to establish the connection from the candidate set stored in the storage 150, and selects the communication interface which is next in the order of priority from the others of the candidate set.

Also, the second apparatus 102 receives the re-searching results of the first apparatus 101, and activates the communication interface corresponding to the re-searching result in the operation 415.

According to an exemplary embodiment, the communication connection is automatically established by using the camera and the display provided in the respective apparatuses in response to a user's request for the communication connection between the apparatuses. Therefore, it is convenient for a user since the communication connection is performed based on only a minimum amount of effort.

Also, various pieces of information about the communication connection, including the interface information and the current state information of the respective apparatuses, are displayed in real time until the connection is completed, and the information displayed through the camera is instantly acquired and analyzed to automatically perform the proper communication connection, so that the apparatus can be used in an optimal communication mode without requiring a user's manual control or other cumbersome operations, thereby advantageously giving instant feedback of information to a user.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A system comprising a display apparatus and a mobile apparatus,
    the display apparatus comprising:
        a first display configured to display first communication interface information on the plurality of communication interfaces supported by the display apparatus; and
        a first camera configured to receive second communication interface information on a communication interface selected by the mobile apparatus among the plurality of communication interfaces included in the first communication interface information and displayed by the mobile apparatus, and
    the mobile apparatus comprising:
        a second camera configured to receive the first communication interface information displayed and supported by the display apparatus; and
        a second display configured to display the second communication interface information to enable a connection with the display apparatus, the second communication interface information being determined based on the first communication interface information received through the second camera,
    wherein the display apparatus is configured to receive the second communication interface information through the first camera, and display identification information to be used to establish the connection on the first display, and
    the mobile apparatus is configured to attempt to establish the connection with the display apparatus based on the identification information.

2. A display apparatus comprising:
    a first display;
    a first camera;
    a communicator configured to comprise a plurality of communication interfaces to communicate with a mobile apparatus; and
    a controller configured:
        in response to a user input to request for a communication connection with the mobile apparatus, to control the first display to display first communication interface information,
        to control the first camera to obtain second communication interface information on a communication interface selected by the mobile apparatus among the plurality of communication interfaces included in the first communication interface information and displayed on a second display of the mobile apparatus, and to control the communicator to connect with the mobile apparatus through the selected communication interface.

3. The display apparatus according to claim 1, wherein the first display is configured to display the first communication interface information supported by the display apparatus.

4. The display apparatus according to claim 3, wherein the display apparatus is configured to transmit the displayed first communication interface information to the mobile apparatus through a second camera of the mobile apparatus.

5. The display apparatus according to claim 4, wherein the controller is configured to activate the communication interface selected by the mobile apparatus, and display first identification information of the display apparatus, the first identification information to be used to establish a connection of the activated communication interface.

6. The display apparatus according to claim 3, wherein the first display is configured to display the first communication interface information as at least one type recognizable by the mobile apparatus among a character, a quick response (QR) code and a barcode.

7. The display apparatus according to claim 1, further comprising a storage configured to store the first communication interface information supported by the display apparatus.

8. The display apparatus according to claim 7, wherein the storage is further configured to store the second communication interface information supported by the mobile apparatus.

9. The display apparatus according to claim 8, wherein if there is a plurality of second communication interfaces included in the second communication interface information and supported by the mobile apparatus, the controller is configured to sort and store the second communication interface information in accordance with a preset order of priority.

10. The display apparatus according to claim 9, wherein the controller is configured to select a second communication interface among the plurality of second communication interfaces in accordance with the preset order of priority, and set up the communication connection with the mobile apparatus through the selected second communication interface.

11. The display apparatus according to claim 10, wherein the first display is configured to display information about the selected second communication interface.

12. The display apparatus according to claim 10, wherein the controller is configured to receive second identification information of the mobile apparatus through the first camera, the second identification information to be used to establish a connection of the selected second communication interface, and set up the communication connection with the mobile apparatus based on the received second identification information.

13. A connection control method to be performed by a display apparatus comprising a first display and a first camera, the method comprising:

receiving a user input to request for a communication connection with a mobile apparatus;

displaying first communication interface information on the plurality of communication interfaces on the first display;

obtaining, through the first camera, second communication interface information on a communication interface selected by the mobile apparatus among the plurality of communication interfaces included in the first communication interface information and displayed on a second display of the mobile apparatus; and connecting with the mobile apparatus, through the selected communication interface.

14. The method according to claim 13, wherein the displaying the first communication interface information further comprises displaying the first communication interface information supported by the display apparatus.

15. The method according to claim 14, further comprising: transmitting the displayed first communication interface information to the mobile apparatus through a second camera of the mobile apparatus.

16. The method according to claim 15, further comprising:

activating the communication interface selected by the mobile apparatus; and displaying first identification information of the display apparatus, the first identification information to be used to establish a connection of the activated communication interface.

17. The method according to claim 14, wherein the displaying the first communication interface information comprises displaying the first communication interface information as at least one type recognizable by the mobile apparatus among a character, a quick response (QR) code and a barcode.

18. The method according to claim 13, further comprising: storing the first communication interface information supported by the display apparatus.

19. The method according to claim 18, further comprising: storing the second communication interface information supported by the mobile apparatus.

20. The method according to claim 19, wherein the storing of the second communication interface information comprises, if there is a plurality of second communication interfaces included in the second communication interface information and supported by the mobile apparatus, sorting and storing the second communication interface information in accordance with a preset order of priority.

21. The method according to claim 20, further comprising:

selecting one second communication interface among the plurality of second communication interfaces in accordance with the preset order of priority; and setting up the communication connection with the mobile apparatus through the selected second communication interface.

22. The method according to claim 21, further comprising:

displaying information about the selected second communication interface on the first display.

23. The method according to claim 21, further comprising:

receiving second identification information of the mobile apparatus through the first camera, the second identification information to be used to establish a connection of the selected second communication interface; and setting up the communication connection with the mobile apparatus based on the received second identification information.

24. A mobile apparatus comprising:
a second display;
a second camera;
a communicator configured to comprise a plurality of communication interfaces to communicate with a display apparatus; and a controller configured:
    in response to a user input to request for a communication connection with the display apparatus, to control the second display to display second communication interface information on the plurality of communication interfaces,
        to control the second camera to obtain first communication interface information on a communication interface selected by the display apparatus among the plurality of communication interfaces included in the second communication interface information and displayed on a first display of the display apparatus, and
    to control the communicator to connect with the display apparatus through the selected communication interface.

25. The mobile apparatus according to claim 24, wherein the second display is configured to display the second communication interface information supported by the mobile apparatus.

26. The mobile apparatus according to claim 25, wherein the mobile apparatus is configured to transmit the displayed second communication interface information to the display apparatus through the first camera of the display apparatus.

27. The mobile apparatus according to claim 26, wherein the controller is configured to activate the communication interface selected by the display apparatus, and display second identification information of the mobile apparatus, the second identification information to be used to establish a connection of the activated communication interface.

28. The mobile apparatus according to claim 24, further comprising a storage configured to store the first communication interface information supported by the display apparatus,
    wherein if there is a plurality of first communication interfaces included in the first communication interface information and supported by the display apparatus, the controller is configured to sort and store the first communication interface information in accordance with a preset order of priority.

29. The mobile apparatus according to claim 28, wherein the controller is configured to select one first communication interface among the plurality of first communication interfaces in accordance with the preset order of priority, control the second display to display information about the selected first communication interface, and set up the communication connection with the display apparatus through the selected first communication interface.

30. The mobile apparatus according to claim 29, wherein the controller is configured to receive first identification information of the display apparatus through the second camera, the first identification information to be used to establish a connection of the selected first communication interface, and set up the communication connection with the display apparatus based on the received first identification information.

31. A connection control method to be performed by a mobile apparatus comprising a display and a camera, the method comprising:
    receiving a user input to request for a communication connection with a display apparatus;
    displaying second communication interface information on the plurality of communication interfaces on the display;
    obtaining, through the camera, first communication interface information on a communication interface selected by the display apparatus among the plurality of communication interfaces included in the second communication interface information and displayed by the display apparatus; and
    connecting with the display apparatus through the selected communication interface.

32. A mobile device, comprising:
    a display;
    a camera;
    a communicator configured to comprise a plurality of communication interfaces to communicate with an external device; and
    a controller configured to:
    to control the display to display second communication interface information on the plurality of communication interfaces,
        to control the camera to obtain first communication interface information on a communication interface selected by the external device among the plurality of communication interfaces included in the second communication interface information and displayed by the external device, and
    determine an optimal communication mode based on the selected communication interface to establish a communication channel with the external apparatus based on the determined optimal communication mode.

33. The mobile device according to claim 32, wherein the communication interface information comprises a plurality of different communication modes, and the controller is configured to determine the optimal communication mode based on:
    a comparison of the plurality of different communication modes with a communication mode supported by the mobile device, and
    a factor related to performance of a communication environment.

34. The mobile device according to claim 33, wherein the factor comprises at least one of throughput and reliability.

* * * * *